United States Patent [19]

Bachem et al.

[11] Patent Number: 4,975,499

[45] Date of Patent: Dec. 4, 1990

[54] POLYAMIDOAMINE RESIN FROM MIXTURE OF DIAMINE AND POLYALKYLENE POLYAMINE

[75] Inventors: Henning Bachem, Cologne; Janos Muszik; Jürgen Reiners, both of Leverkusen; Carlhans Süling, Odenthal; Wolf-Dieter Schröer, Leverkusen, all of Fed. Rep. of Germany

[73] Assignee: Bayer Aktiengesellschaft, Leverkusen, Fed. Rep. of Germany

[21] Appl. No.: 322,595

[22] Filed: Mar. 13, 1989

[30] Foreign Application Priority Data

Mar. 16, 1988 [DE] Fed. Rep. of Germany ....... 3808741

[51] Int. Cl.$^5$ .............................................. C08G 69/48
[52] U.S. Cl. .................... 525/430; 525/435; 528/323; 528/324; 528/342
[58] Field of Search ................ 525/430, 435; 528/323, 528/324, 342

[56] References Cited

U.S. PATENT DOCUMENTS 3,352,833 11/1967 Earle ..................................... 525/430
3,951,921 4/1976 Espy et al. .......................... 525/430

*Primary Examiner*—Harold D. Anderson
*Attorney, Agent, or Firm*—Sprung Horn Kramer & Woods

[57] ABSTRACT

Cationic crosslinkable polyamidoamine resins which are obtainable by reaction of (A) a water-soluble polyamidoamine prepared from
  (1) aliphatic or aromatic dicarboxylic acids or functional derivatives thereof, such as anhydrides, esters or half-esters, and ω-aminocarboxylic acids containing at least 3 C atoms or lactams thereof, and
  (2) a polyamine mixture of (α) polyamines which contain at least two amino groups which are capable of amide formation and at least one further secondary or tertiary amino group, and (β) polyamines which contain only two amino groups which are capable of amide formation,
(B) with an epihalogenohydrin, in a molar ratio of 0.7 to 3.5 mol of epihalogenohydrin per mol of basic nitrogen in component (A),
(C) with an inorganic base and
(D) with 0.2 to 9.0 mol of a halogen-free mineral or carboxylic acid, the acid being added in at least an amount to give a pH of at least 5, are used as agents for imparting wet strength to paper.

20 Claims, No Drawings

POLYAMIDOAMINE RESIN FROM MIXTURE OF DIAMINE AND POLYALKYLENE POLYAMINE

The invention relates to cationic crosslinkable polyamidoamine resins which are obtainable by reaction of
(A) a water-soluble polyamidoamine prepared from
  (1) aliphatic or aromatic dicarboxylic acids or functional derivatives thereof, such as anhydrides, esters or half-esters, and if appropriate ω-aminocarboxylic acids containing at least 3 C atoms or lactams thereof, and
  (2) a polymine mixture of (α) polyamines which contain at least two amino groups which are capable of amide formation and at least one further secondary or tertiary amino group, and (β) polyamines which contain only two amino groups which are capable of amide formation, in a molar ratio of (α):(β) of 1:1 to 40:1,
(B) with an epihalogenohydrin and if appropriate simultaneous or subsequent reaction with a polyamine A (2), in a molar ratio of 0.7 to 3.5 mol of epihalogenohydrin per mol of basic nitrogen in component (A),
(C) with an inorganic base in a molar ratio of 0.2 to 2.0 mol of base per mol of epihalogenohydrin group, and
(D) with 0.2 to 9.0 mol of a halogen-free mineral or carboxylic acid per mol of basic nitrogen in component A, the acid being added in at least an amount to give a pH of at least 5,
to their preparation and their use as agents for imparting wet strength to paper.

Crosslinkable reaction products, containing halogenohydrin groups, of polyamines and polyamidoamines with an epihalogenohydrin and their use for imparting wet strength to paper are known. They are used, above all, in papermaking in the neutral range of pH 6-8.

Thus, for example, self-crosslinking water-soluble reaction products of epihalogenohydrins and basic polyamidoamines or polyamines or mixtures thereof, an excess of epihalogenohydrin per equivalent of basic amino groups being used in each case, are described in U.S. Pat. Nos. 3,733,290, 3,778,339, 3,813,362, 4,336,835, 4,287,110, 3,311,594, 3,640,840, 4,487,884, 2,926,154 and 3,332,901.

Water-soluble condensation products of ε-caprolactam, polyamines, polyamidoamines and epichlorohydrin are known from U.S. Pat. No. 3,645,954.

Agents for imparting wet strength which have previously been used in practice have a high content of halogenohydrin groups. These are necessary when the products are used as agents for imparting wet strength to establish high mechanical strength.

However, when used as agents for imparting wet strength in papermaking, incomplete reaction with the cellulose fibres takes place. As a result, portions of the products pass in unreacted form into the effluent and contribute towards pollution thereof with organically bound halogen.

The object of the present invention was to prepare cationic crosslinkable polyamidoamine resins which can be crosslinked in the pH range ≧6 and are comparable to the customary epihalogenohydrin resins in wet strength effect and also contain considerably less organically bound halogen.

It has now been found that the treatment according to the invention of compounds containing halogenohydrin groups gives cationic crosslinkable products which contain considerably less organically bound halogen and outstandingly improve the wet strength of a paper treated with them.

It has also been found that particularly low halogen contents and very good wet strengths can be established by using polyamidoamines containing up to 50 mol % of polyamide structural units.

Particularly preferred cationic crosslinkable polyamidoamine resins are obtainable by reaction of
(A) a water-soluble polyamidoamine having base equivalent weights of ≧450, preferably 500 to 1,000, and a molecular weight of at least 800 and prepared from
  (1) aliphatic saturated or olefinically unsaturated or aromatic dicarboxylic acids having 2 to 12 C atoms or functional derivatives thereof, such as anhydrides, esters or half-esters, and if appropriate ω-aminocarboxylic acids containing 3 to 6 C atoms or lactams thereof, and (2) a polyamine mixture of (α) polyamines of the formulae

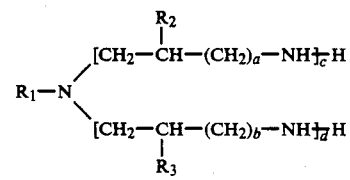

and if appropriate

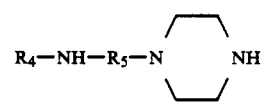

in a molar ratio of I:II=4–100:0–1, and (β) polyamines of the formula

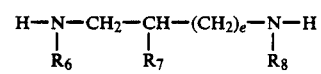

wherein
$R_1$, $R_6$ and $R_8$ independently of one another stand for hydrogen or $C_1$–$C_4$-alkyl,
$R_2$, $R_3$, $R_4$ and $R_7$ independently of one another stand for hydrogen, methyl or ethyl,
$R_5$ stands for $C_2$–$C_4$-alkylene,
a, b and e independently of one another stand for an integer from 0 to 4 and
c and d independently of one another stand for an integer from 1 to 6,
in a molar ratio of $\alpha:\beta = 1$–25:1, and in a molar ratio of 1:2 = 0.8–1.2:1,
(B) with an epihalogenohydrin, and if appropriate simultaneous or subsequent reaction with an amine of the formulae I to III in a molar ratio of 0.7 to 3.5 mol, preferably 0.8 to 3.0 mol, of epihalogenohydrin per mol of basic nitrogen in component (A),
(C) with an inorganic base, in a molar ratio of 0.2 to 2.0 mol, preferably 0.3 to 1.5 mol, of base per mol of epihalogenohydrin group and
(D) with 0.2 to 9.0 mol, preferably 0.3 to 8.5 mol, of a halogen-free mineral or carboxylic acid up to pH values of at least 5, preferably of 1.5 to 4.5.

The polymeric compounds preferably have a molecular weight of 2,000 to 200,000. (weight average molecular weight)

The aqueous or aqueous organic solutions or emulsions have a viscosity of 15 to 300 mPas, preferably 20 to 250 mPas, at 25° C. at a solids content of 5 to 30% by weight, preferably 10 to 25% by weight.

The polyamidoamine resins according to the invention are preferably prepared in an aqueous medium. It is also possible to use mixtures of water with other polar solvents, such as methanol, ethanol, isopropanol, tert-.butanol, ethylene glycol, diethylene glycol, triethylene glycol, polyethylene glycol, glycerol or dimethylformamide.

The reaction of the starting components A and B is carried out in a known manner. In this reaction, aqueous or aqueous-organic solutions or emulsions having solids contents of about 10 to 40% by weight are stirred at temperatures of 25° to 95° C., preferably 35° to 90° C.

In a preferred embodiment, reaction with a base is already carried out during the reaction of A and B at temperatures of 15° to 95° C., preferably 20° to 70° C., and at a minimum viscosity of 10 mPas. pH values of 8 to 14, preferably 8.5 to 12, are in this way established.

During this procedure, free or bound acid is neutralized and partial epoxidation of the halogenohydrin groups present is effected, with salt formation.

While retaining the abovementioned basic pH values and if appropriate under addition of a solvent, the reaction mixture is then stirred at 15° to 95° C., preferably 20° to 70° C., for 10 minutes to 10 hours, preferably 15 minutes to 8 hours.

In reaction stage (D), the acid or acid derivative is added at this temperature in an amount to give pH values of $\leq 5.0$, preferably 1.5 to 4.5.

In another embodiment, intermediate isolation of the reaction products A/B and subsequent reaction to give the products (C) and (D) are possible.

The reaction of the starting components A and B is initially carried out analogously. In this reaction, the mixture is stirred until a sample of the reaction mixture in the form of a 15% strength aqueous or aqueous-organic solution or emulsion has a viscosity of 15 to 300 mPas, preferably 20 to 250 mPas, at 25° C. Acids are then added to the viscous mixture, in order to end the action and to stabilize the self-crosslinking products, so that the pH is 1.5 to 5. Suitable stabilizing acids are, in particular, those listed below. In the following reaction step, the intermediate products A/B are brought to pH values of 8 to 14, preferably 8.5 to 12, with the aid of a base at temperatures of 15° to 95° C., preferably 20° to 70° C. The procedure is then as described.

Bases which may be mentioned above all are: LiOH, Ca(OH)$_2$, Ba(OH)$_2$, Sr(OH)$_2$, NH$_3$, Na$_2$CO$_3$, K$_2$CO$_3$, Na$_3$PO$_4$, K$_3$PO$_4$ and in particular KOH and NaOH or mixtures thereof. Acids or acid derivatives which may be mentioned are:

1. halogen-free mineral acids or acidic derivatives of these acids, such as sulphurous acid, silicic acid, boric acid, nitric acid, carbonic acid and in particular sulphuric acid, phosphoric acid and alkali metal hydrogen sulphates, 2. halogen-free mono- or polycarboxylic acids optionally containing hydroxyl groups or derivatives of these acids, such as acetic acid, acetic anhydride, propionic acid, oxalic acid, malonic acid, succinic acid, glutaric acid, adipic acid, maleic acid, lactic acid, tartaric acid, glycolic acid and in particular formic acid, malic acid and citric acid, or mixtures thereof.

The solids content of the products is then set at the desired value by dilution with water and/or solvent.

Dicarboxylic acids A (1) which may be mentioned are: oxalic acid, malonic acid, succinic acid, glutaric acid, adipic acid, azelaic acid, sebacic acid, 1,12-dodecanedioic acid, itaconic acid, terephthalic acid and isophthalic acid.

The following compounds may be mentioned as the polyamine (I) and (II): diethylenetriamine, triethylenetetramine, tetraethylenepentamine, pentaethylenehexamine, hexaethyleneheptamine, heptaethyleneoctamine, dipropylenetriamine, tripropylenetetramine, methyl-bis-(3-aminopropyl)-amine, dihexamethylenetriamine, aminoethylpiperazine or mixtures thereof.

Preferred diamines (III) are: ethylenediamine, N,N'-dimethyl-ethylenediamine, N-methyl-ethylenediamine, 1,2-diaminopropane, 1,3-diaminopropane, N,N'-dimethyl-1,3-diaminopropane, N-methyl-1,3-diaminopropane, N,N-dimethyl-1,3-diaminopropane and 1,6-diaminohexane or mixtures thereof.

The preferred lactam is ε-caprolactam.

The preferred example of (B) is epichlorohydrin.

Clear, preferably aqueous, solutions or emulsions which are storage-stable for months, preferably 3 to 9 months, even at a high solids content of up to 30% by weight, and provide an outstanding improvement to the wet strength of paper treated with them are obtained in the manner described under industrially simple and easily manageable conditions The crosslinkable polyamidoamine resins according to the invention differ from known polyamine-epihalogenohydrin reaction products in respect of their content of organically bound halogen and the AOX value (=adsorbable organic halogen).

It is thus possible for the organic halogen content of the compounds according to the invention and the AOX value to be 60 to 98%, preferably 70 to 95%, lower than in the known polyamine-polyamidoamine/epihalogenohydrin reaction products.

Precursors with a significantly weaker basicity with base equivalent weights of $\geq 450$, preferably 500 to 1,000, are moreover obtained by incorporation of up to 50 mol % of polyamide structural units into the polyamidoamine precursors.

Paper is treated with the polymers according to the invention in a known manner. Preferably, the polymers are added in the form of aqueous solutions or emulsions to the suspension of the paper pulp, which is then processed to paper.

The amounts added are between 0.5 to 4.0% by weight of the solution or emulsion (based on the paper pulp) with an active compound content of 10 to 25% by weight, depending on the desired effect. Amounts to be added of 6% by weight or more may be necessary in the case of particularly high wet strength requirements, for example for laminated papers with a high ash content and low weight per unit area.

EXAMPLE 1

(a) 292 g of adipic acid are added to an initial mixture of 113 g of diethylenetriamine and 60 g of ethylenediamine; during this addition, the internal temperature of the mixture rises to 135° C. The mixture is then heated under reflux at 140°–150° C. for 30 minutes and is subsequently heated to 193° C. in the course of 3 hours, the distillate being removed uniformly.

The melt is now cooled to 160° C. and 390 ml of water are carefully added. The product dissolves slowly and is subsequently stirred at 95°-100° C. for a further 2 hours.

Viscosity: 395 mPas (25° C.)
Solids content: 48.9% by weight
Base equivalent weight: 531 g/equivalent of basic N (b) 56.5 g of epichlorohydrin are added dropwise to an initial mixture of 335 g of a precursor according to Example (1a) and 568 ml of water at 25°-30° C. in the course of 30 minutes and the mixture is subsequently stirred for 30 minutes.

The reaction mixture is then heated to 75° C., while stirring, and diluted with 630 ml of water, as the viscosity increases. At the same time, it is cooled to 50°-60° C. and brought to pH 10 by means of a 45% strength NaOH solution. Stirring is then continued at a constant pH until the desired viscosity is reached, and the mixture is subsequently reacted with a sulphuric acid solution, the pH being 2.5.

Viscosity: 55 mPas (25° C.)
Solids content: 15.0% by weight
Organic Cl content: 0.16% by weight

EXAMPLE 2

(a) 292.0 g of adipic acid are added to an initial mixture of 123.6 g of diethylenetriamine, 51.0 g of ethylenediamine and 113 g of $\epsilon$-caprolactam and the mixture is heated under reflux for 45 minutes.

The mixture is then heated to 197° C. in the course of 3 hours, water distilling off uniformly. The melt is now cooled to 165° C. and 500 ml of water are added. Thereafter, the solution is subsequently stirred at 90° C. for a further hour.

Viscosity: 378 mPas (25° C.)
Solids content: 49.9% by weight
Base equivalent weight: 563.

(b) 563 g of a precursor according to Example (2a) are initially introduced as a mixture with 940 ml of water, and 97.0 g of epichlorohydrin are added.

The mixture is then heated to 70° C. and 1,350 ml of water are added, as the viscosity increases. During this addition, the reaction mixture cools somewhat, and NaOH solution is simultaneously added in an amount such that the pH is 10. While maintaining the alkaline pH, the mixture is now subsequently stirred until the pH remains constant, and the pH is then brought to pH 3.0 with HCOOH.

Viscosity: 74 mPas (25° C.)
Solids content: 15.0% by weight
Organic Cl content: 0.15%.

EXAMPLE 3

(a) 292 g of adipic acid are added to an initial mixture of 120 g of diethylenetriamine, 51 g of ethylenediamine and 226 g of $\epsilon$-caprolactam and the mixture is heated under reflux for 1 hour.

The mixture is then heated to 199° C. in the course of 3 hours and the water of reaction formed is uniformly distilled off. The polyamidoamine melt is now cooled to 165° C. and dissolved in 600 ml of water. The clear yellowish solution is now subsequently stirred at 90°-95° C. for a further hour.

Viscosity: 410 mPas (25° C.)
Solids content: 49.4% by weight
Base equivalent weight: 598 g/equivalent of basic N (b) 94.1 g of epichlorohydrin are added to an initial mixture of 598 g of a polyamidoamine precursor according to Example (3a) and 900 ml of water over a period of 25 minutes.

After the addition, the mixture is subsequently stirred at 30° C. for 30 minutes and is then heated to 70° C.

As the viscosity increases, the mixture is diluted with 1,250 ml of water and the pH is brought to 10 with NaOH. Stirring is now continued at 50°-55° C. and pH 10 until the desired viscosity is reached. The pH is then brought to pH 2.7 with the aid of a sulphuric acid solution.

Viscoscity: 56 mPas (25° C.)
Solids content: 15.0% by weight
Organic Cl content: 0.11%.

USE EXAMPLES

(4) Example for Determination of the Wet Breaking Load

Bleached pine sulphite pulp is beaten in a Hollander at a consistency of 2.5% to a Schopper-Riegler freeness of 38°. 100 g thereof are introduced into a glass beaker and diluted to 1,000 ml with water.

2 and 4% by weight of the product according to the invention (15% by weight of solid), based on the fibre, are introduced into the glass beaker. After a stirring time of 3 minutes, sheets of paper with a weight per unit area of about 80 g/m$^2$ are formed with the contents of the glass beakers on a sheet-forming machine (Rapid-Köthen apparatus). The sheets of paper are dried at 90° C. for 6 minutes in vacuo under a pressure of 20 mm of Hg and after-heated in a drying cabinet at 110° C. for a further 15 minutes.

After the conditioning, 5 test strips 1.5 cm wide are cut out of each sheet of paper and immersed in distilled water for 5 minutes. The wet strips are then clamped in a tensile testing machine and the wet breaking loads are determined.

The results obtained are shown in the following table.

| | Wet breaking load (in Newton) Amount used | |
|---|---|---|
| Examples | 2% | 4% |
| 1 b | 9.2 | 13.1 |
| 1 b | 9.2 | 13.1 |
| 2 b | 9.8 | 14.4 |
| 3 b | 9.3 | 13.8 |

(5) Example for the Determination of the AOX Content* in the Effluent (a) Pulp 1,000 ml of water are added to 2 g of pulp in a glass beaker and the mixture is beaten to homogeneity by stirring. Thereafter, it is subsequently stirred at room temperature for 1 hour and the water is then separated off cleanly from the pulp by filtration.

* The determination was carried out in accordance with DIN 38049 [German standard method for analysis of water, effluent and sludge. Summary action and pulp separation parameters (group H), determination of the adsorbable organically bound halogens (AOX)].

For the AOX determination, the water is brought to pH 2.0 with concentrated HNO$_3$ and analyzed in this form.

AOX value: 0.206 mg/l (b) Pulp plus agent for imparting wet strength 2 g of pulp are pretreated analogously to (a); before the filtration, 3.0% by weight of an agent for imparting wet strength according to Example (1b) (based on the fibre) are added and the aqueous suspension is stirred at room temperature for 10 minutes. It is then filtered analogously to (a) and acidified.

AOX value (total): 0.270 mg/l
AOX value (-pulp): 0.064 mg/l

We claim:

1. A cationic crosslinkable polyamidoamine resin obtained by reaction of
(A) a water-soluble polyamidoamine prepared from
  (1) an aliphatic or aromatic dicarboxylic acid or functional derivative thereof an or a mixture of 1) with ω-aminocarboxylic acid containing at least 3 C atoms or a lactam thereof, and
  (2) a polyamine mixture of α) a polyamine which contains at least two amino groups which are capable of amide formation and at least one further secondary or tertiary amino group, and β) a polyamine which contains only two amino groups which are capable of amide formation, in a molar ratio of α):β) of 1:1 to 40:1,
(B) with an epihalogenohydrin, in a molar ratio of 0.7 to 3.5 mol of epihalogenohydrin per mol of basic nitrogen in component A),
(C) with an inorganic base in a molar ratio of 0.2 to 2.0 mol of base per mol of epihalogenohydrin group, and
(D) with 0.2 to 9.0 mol of a halogen-free mineral or carboxylic acid per mol of basic nitrogen in component A, the acid being added in at least an amount to give a pH of at least 5.

2. A cationic crosslinkable polyamidoamine resin according to claim 1, wherein said resin is obtained by reaction of
(A) a water-soluble polyamidoamine having a base equivalent weight of ≧450 and a molecular weight of at least 800 and prepared from 1) an aliphatic saturated or olefinically unsaturated or aromatic dicarboxylic acid having 2 to 12 C atoms or a functional derivative thereof or a mixture of 1) with an ω-aminocarboxylic acid containing at least 3 to 6 C atoms or a lactam thereof, and 2) a polyamine mixture of α) a polyamine of the formulae

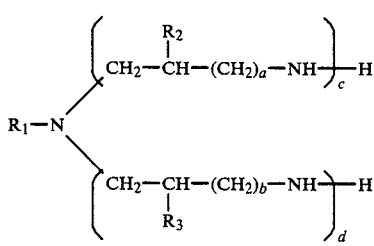

and β) a polyamine of the formula

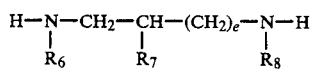

wherein
R$_1$, R$_6$ and R$_8$ independently of one another stand for hydrogen or C$_1$-C$_4$-alkyl,
R$_2$, R$_3$, R$_4$ and R$_7$ independently of one another stand for hydrogen, methyl or ethyl,
R$_5$ stands for C$_2$-C$_4$-alkylene,
a, b and e independently of one another stand for an integer from 0 to 4 and c and d independently of one another stand for an integer from 1 to 6,
in a molar ratio of α:β = 1-25:1, and in a molar ratio of 1:2 = 0.8-1.2:1,
(B) with an epihalogenohydrin in a molar ratio of 0.7 to 3.5 mol, of epihalogenohydrin per mol of basic nitrogen in component A),
(C) with an inorganic base, in a molar ratio of 0.2 to 2.0 mol, of base per mol of epihalogenohydrin group and
(D) with 0.2 to 9.0 mol of a halogen-free mineral or carboxylic acid up to pH values of at least 5.

3. A cationic crosslinkable polyamidoamine resin according to claim 1, which has a weight average molecular weight of 2,000 to 200,000.

4. A cationic crosslinkable polyamidoamine resin according to claim 1, in a form of a 5 to 30% strength by weight solution or emulsion which has a viscosity of 15 to 300 m Pascals at 25° C.

5. A cationic crosslinkable polyamidoamine resin according to claim 1, wherein the base is LiOH, Ca(OH)$_2$, Ba(OH)$_2$, Sr(OH)$_2$, NH$_3$, Na$_2$CO$_3$, K$_2$CO$_3$, Na$_3$PO$_4$, K$_3$PO$_4$, KOH, NaOH or mixtures thereof.

6. A cationic crosslinkable polyamidoamine resin according to claim 1, wherein the halogen-free mineral or carboxylic acid or acid derivative thereof is sulphurous acid, nitric acid, sulphuric acid, phosphoric acid, alkali metal hydrogen sulphates, acetic acid, acetic anhydride, propionic acid, oxalic acid, malonic acid, succinic acid, glutaric acid, adipic acid, formic acid, malic acid or citric acid or mixtures thereof.

7. A cationic crosslinkable polyamidoamine resin according to claim 1, in a form of a 15% strength by weight solution or emulsion having an organic halogen content of 0.01 to 0.5% by weight.

8. A cationic crosslinkable polyamidoamine resin according to claim 1, wherein with said epihalogenohydrin in B) there is a simultaneous or subsequent reaction with a polyamine A)2).

9. A cationic crosslinkable polyamidoamine resin according to claim 1, wherein the functional derivative of said aliphatic or aromatic dicarboxylic acid in A) 1) is an anhydride, an ester or a half-ester.

10. A cationic crosslinkable polyamidoamine resin according to claim 2, wherein A) the water-soluble polyamidoamine has a base equvalent weight of 500 to 1,000.

11. A cationic crosslinkable polyamidoamine resin according to claim 2, wherein the functional derivatives of said alphatic saturated or olefinically unsaturated or aromatic dicarboxylic acid is an anhydride, an ester or half-ester.

12. A cationic crosslinkable polyamidoamine resin according to claim 2, wherein said polyamine α) further comprises a moiety of the formula

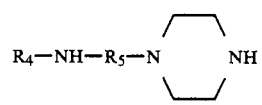

and the molar ratio of I:II is 4–100:0–1.

13. A cationic crosslinkable polyamidoamine resin according to claim 2, wherein said epihalogenohydrin in B) there is a simultaneous or subsequent reaction with an amine of the formula I to III.

14. A cationic crosslinkable polyamidoamine resin according to claim 13, wherein the molar ratio of said epihalogenohydrin per mole of basic nitrogen in component A) is 0.8 to 3.0 mol.

15. A cationic crosslinkable polyamidoamine resin according to claim 2, wherein the molar ratio of said inorganic base to said epihalogenohydrin is 0.3 to 1.5 mol.

16. A cationic crosslinkable polyamidoamine resin according to claim 2, wherein the amount of said halogen-free mineral carboxylic acid is 0.3 to 8.5 mol per mol. of basic nitrogen in component A.

17. A cationic crosslinkable polyamidoamine resin according to claim 2, wherein said halogen-free mineral or carboxylic acid is added in such an amount that the pH is 1.5 to 4.5.

18. A cationic crosslinkable polyamidoamine according to claim 4, wherein the viscosity is 20 to 250 m Pascals at 25° C.

19. A cationic crosslinkable polyamidoamine resin according to claim 1, wherein component A) comprises said aliphatic or aromatic dicarboxylic acid or functional derivative thereof and an $\omega$-aminocarboxylic acid containing at least 3 C atoms or a lactam thereof.

20. A cationic crosslinkable polyamidoamine resin according to claim 2, wherein component A) comprises said aliphatic or aromatic discarboxylic acid or functional derivative thereof and an $\omega$-aminocarboxylic acid containing at least 3 C atoms or a lactam thereof.

* * * * *